No. 757,158. PATENTED APR. 12, 1904.
W. G. TURRILL.
TOY.
APPLICATION FILED NOV. 18, 1903.
NO MODEL.
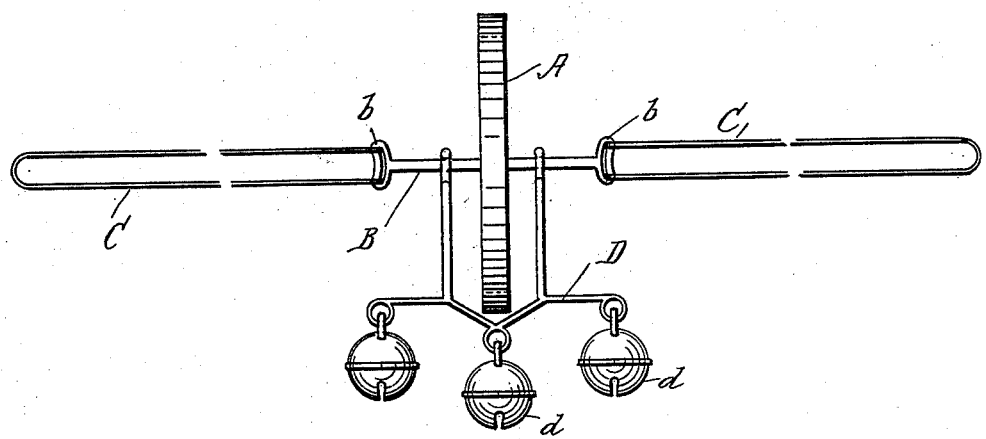
FIG_1_
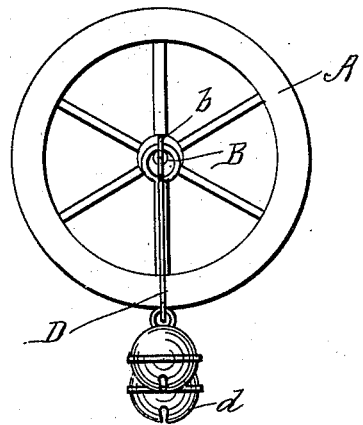
FIG_2_
WITNESSES:
John C. O'Shea
Walter Allen
INVENTOR
William G. Turrill.
BY
Herbert W. Jenner.
Attorney No. 757,158.

Patented April 12, 1904.

UNITED STATES PATENT OFFICE.

WILLIAM G. TURRILL, OF BOSTON, MASSACHUSETTS.

TOY.

SPECIFICATION forming part of Letters Patent No. 757,158, dated April 12, 1904.

Application filed November 18, 1903. Serial No. 181,621. (No model.)

*To all whom it may concern:*

Be it known that I, WILLIAM G. TURRILL, a citizen of the United States, residing at Boston, in the county of Suffolk and State of Massachusetts, have invented certain new and useful Improvements in Toys; and I do hereby declare the following to be a full, clear, and exact description of the invention, such as will enable others skilled in the art to which it appertains to make and use the same.

This invention relates to sounding toys; and it consists in the novel construction and combination of the parts hereinafter fully described and claimed.

In the drawings, Figure 1 is a front view of the toy. Fig. 2 is a side view of the toy.

A is a wheel secured upon a spindle B, which has loops $b$ at its ends.

C represents doubled cords, strings, or other flexible connections which are secured to the loops $b$.

D is a yoke suspended from the spindle B between the loops and the hub of the wheel, and $d$ represents bells which are supported from the yoke D.

When the wheel is revolved, so as to twist the cords, and the cords are then pulled longitudinally in opposite directions, the wheel is kept in rapid motion, being revolved first in one direction and then in the other direction. The shaft or spindle revolves with the wheel and communicates a vibrating motion to the yoke, which causes the bells to sound as long as the wheel is kept in motion.

What I claim is—

1. In a toy, the combination, with a wheel provided with a spindle, and flexible connections for revolving the said wheel and spindle, of a yoke suspended from the said spindle, and sounding devices carried by the said yoke.

2. In a toy, the combination, with a wheel provided with a spindle having loops at its ends, and flexible connections secured to the said loops and operating to revolve the said wheel and spindle, of a yoke suspended from the said spindle, and sounding devices carried by the said yoke.

In testimony whereof I affix my signature in presence of two witnesses.

WILLIAM G. TURRILL.

Witnesses:
 ALICE J. MURRAY,
 FREDK. K. DAGGETT.